(12) United States Patent
Venkatakrishnan et al.

(10) Patent No.: US 10,839,125 B1
(45) Date of Patent: Nov. 17, 2020

(54) POST-PLACEMENT AND POST-ROUTING PHYSICAL SYNTHESIS FOR MULTI-DIE INTEGRATED CIRCUITS

(71) Applicant: Xilinx, Inc., San Jose, CA (US)

(72) Inventors: Sreesan Venkatakrishnan, San Jose, CA (US); Ruibing Lu, Santa Clara, CA (US); Sabyasachi Das, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 67 days.

(21) Appl. No.: 16/139,997

(22) Filed: Sep. 24, 2018

(51) Int. Cl.
| | | |
|---|---|---|
| *G06F 30/34* | (2020.01) | |
| *G06F 30/392* | (2020.01) | |
| *G06F 30/394* | (2020.01) | |
| *G06F 30/398* | (2020.01) | |
| *G06F 119/12* | (2020.01) | |

(52) U.S. Cl.
CPC ............ *G06F 30/34* (2020.01); *G06F 30/392* (2020.01); *G06F 30/394* (2020.01); *G06F 30/398* (2020.01); *G06F 2119/12* (2020.01)

(58) Field of Classification Search
CPC ...... G06F 30/34; G06F 30/392; G06F 30/394; G06F 30/398; G06F 2119/12
USPC .......................................... 716/104, 110, 122
See application file for complete search history.

(56) References Cited

U.S. PATENT DOCUMENTS

| | | |
|---|---|---|
| 4,924,589 A | 5/1990 | Leedy et al. |
| 5,880,598 A | 3/1999 | Duong |
| 7,030,466 B1 | 4/2006 | Hsuan et al. |
| 7,111,268 B1 | 9/2006 | Anderson et al. |
| 7,127,696 B2 | 10/2006 | Alpert et al. |
| 7,146,590 B1 | 12/2006 | Chaudhary |
| 7,152,217 B1 | 12/2006 | Srinivasan |
| 7,163,842 B2 | 1/2007 | Karnezos |
| 7,979,831 B1 | 7/2011 | Srinivasan |
| 8,122,420 B1 | 2/2012 | Kannan et al. |
| 8,156,456 B1 | 4/2012 | Rahman et al. |
| 8,201,130 B1 | 6/2012 | Kalman et al. |
| 8,283,771 B2 | 10/2012 | Somasekhar et al. |
| 8,418,115 B1 | 4/2013 | Tom et al. |
| 8,458,640 B2 | 6/2013 | Gao et al. |

(Continued)

OTHER PUBLICATIONS

Altera, "Netlist Optimization and Physical Synthesis," Quartus II Handbook, version 13.1, vol. 2, Nov. 2013, 16 pages. URL http://www.altera.com/literature/hb/qts/qts_qii52007.pdf.

(Continued)

*Primary Examiner* — Paul Dinh
(74) *Attorney, Agent, or Firm* — Kevin T. Cuenot

(57) ABSTRACT

Methods, systems, and apparatus, including computer programs encoded on computer storage media, for performing post-routing and post-placement physical synthesis optimizations. One of the methods includes receiving a circuit design of a multi-die integrated circuit (IC) device having a first die connected with a second die, wherein the circuit design specifies a respective initial component placement of each of a plurality of components on the first die and the second die. A first driver on the first die having a plurality of loads on the second die is selected. A transmit site is selected on the first die that reduces a distance between the first driver and a load of the plurality of loads on the second die. The circuit design is modified including moving the first driver to the selected transmit site on the first die.

21 Claims, 8 Drawing Sheets

(56) References Cited

U.S. PATENT DOCUMENTS

| | | | |
|---|---|---|---|
| 8,671,379 B1 | 3/2014 | Jain et al. | |
| 8,886,481 B1 | 11/2014 | Rahman et al. | |
| 9,996,652 B2 | 6/2018 | Sinnadurai et al. | |
| 10,496,777 B1 | 12/2019 | Venkatakrishnan et al. | |
| 2009/0106723 A1* | 4/2009 | Malekkhosravi | G06F 30/30 716/125 |
| 2010/0031217 A1* | 2/2010 | Sinha | G06F 30/392 716/122 |
| 2015/0154337 A1* | 6/2015 | Fang | G06F 30/392 716/120 |
| 2018/0341738 A1 | 11/2018 | Kahng et al. | |

OTHER PUBLICATIONS

Altera, "Timing Closure and Optimization," Quartus II Handbook, version 13.1, vol. 2, Nov. 2013, 46 pages. URL http://www.altera.com/literature/hb/qts/qts_qii52005.pdf.

Synopsis, "FPGA Design Solution for High-Reliability Applications," Synplify Premier Brochure, 2011, 4 pages. URL http://www.synopsys.com/Tools/Implementation/FPGAImplementation/Documents/synpremier-brochure.pdf.

Xilinx, Inc., "UltraScale Architecture Configurable Logic Block," User Guide, v1.5, Feb. 28, 2017, 58 pages, San Jose, CA USA, URL http://www.xilinx.com/support/documentation/user_guides/ug574-ultrascale-clb.pdf.

Xilinx, Inc., "Xilinx Stacked Silicon Interconnect Technology Delivers Breakthrough FPGA Capacity, Bandwidth, and Power Efficiency," White Paper v1.2, Dec. 11, 2012, 10 pages, San Jose, CA USA, URL http://www.xilinx.com/support/documentation/white papers/WP380 Stacked Silicon Interconnect Technology.pdf.

Altera Corporation, "Hyper-Pipelining for Stratix 10 Designs," Jun. 8, 2015, <https://www.altera.com/content/dam/altera-www/global/en_US_pdsf/liter- ature/an/an715.pdf>, 29 pg.

Synopsys, Inc., "Synopsys Synplify Premier, The Ultimate FPGA Implementation Platforrn,The best of both worlds: Productivity & Perfomrance," 2011, <http://www.synopsys.com/Tools/Implementation/FPGAImplementation/Docum-ents/synpremier-brochure.pdf>, 4 pg.

Xilinx, Inc., "UltraScale Architecture Configurable Logic Block User Guide," UG574, v1.4, Nov. 24, 2015, <http://www.xilinx.com/support/documentation/user_guides/ug574-ultrasc- ale-eb.pdf>, 60 pg.

* cited by examiner

POST-PLACEMENT AND POST-ROUTING PHYSICAL SYNTHESIS FOR MULTI-DIE INTEGRATED CIRCUITS

TECHNICAL FIELD

This specification relates to integrated circuits (ICs) and, more particularly, to performing physical synthesis optimizations to facilitate timing improvements in circuit designs for ICs.

BACKGROUND

Implementing a circuit design within an integrated circuit (IC), whether a programmable IC or an application specific IC (ASIC), entails processing the circuit design through a design flow. The design flow includes multiple, different phases. These phases generally include synthesis, placement, and routing.

Synthesis refers to the process of converting, or translating, an abstract, programmatic description of a circuit into a low-level design implementation. The abstract, programmatic description of the circuit describes behavior of the circuit and is also referred to as a "behavioral description" or a "register transfer level (RTL) description" of the circuit. The behavioral description is often specified using a hardware description language (HDL). The low-level design implementation generated through synthesis typically is specified as inter-connected logic gates.

Synthesis may also include mapping. Mapping is the process of correlating, or matching, the logic gates of the low-level circuit design to the various types of circuit blocks or resources that are actually available in the particular IC in which the circuit design is to be implemented, i.e., the "target IC." For example, since a lookup table (LUT) may implement a complex function, one or more logic gates of the low-level design implementation may be mapped to a single LUT, or other programmable tile of the target IC. The mapped circuit design specifies the same functionality as the low-level design implementation, albeit in terms of the particular circuit blocks available on the target IC as opposed to low-level logic gates.

Placement is the process of assigning elements of the synthesized circuit design to particular instances of circuit blocks and/or resources having specific locations on the target IC. Once placed, a circuit element of the circuit design has a specific location on the target IC as opposed to only being assigned to a particular type of circuit block and/or resource as is the case after mapping and prior to placement. The location of a circuit element of a circuit design, once placed, is the location on the target IC of the instance of the circuit block and/or resource to which the circuit element is assigned.

Routing is the process of selecting particular routing resources such as wires, PIPs, PIP settings, and/or other interconnect circuitry to electrically couple the various circuit blocks of the target IC after placement.

Modern circuit designs often have aggressive timing requirements. Significant time is spent processing the circuit design through the design flow in an attempt to meet these timing requirements. One way of meeting timing requirements, or "closing timing," is to select one or more signal paths of the circuit design and perform timing optimization on the selected signal paths. The particular signal paths to optimize to achieve timing closure, however, are not easily determined. Furthermore, when trying to improve timing performance after routing has been performed, there is very little flexibility in how much the design can be changed.

Multi-die ICs are devices that package together multiple dies using integrated communication channels. Multi-die ICs can be built using a variety of packaging technologies, including silicon interposers, interconnect bridges, and die stacking, to name just a few examples. Multi-die ICs are used for connecting multiple, possibly heterogeneous, dies into a single package. Multi-die ICs also are also used to reduce manufacturing cycle time and to increase manufacturing yield by building larger numbers of smaller, more reliable dies rather than smaller numbers of larger, less reliable monolithic dies.

SUMMARY

This specification describes how a system can perform post-placement and post-routing physical synthesis optimizations. This means that the system can modify a netlist after the placement or after the routing stages of a design flow in order to improve the timing performance of a circuit design.

In general, one innovative aspect of the subject matter described in this specification can be embodied in methods that include the actions of receiving a circuit design of a multi-die integrated circuit (IC) device having a first die connected with a second die, wherein the circuit design specifies a respective initial component placement of each of a plurality of components on the first die and the second die; receiving a selection of a first driver on the first die having a plurality of loads on the second die; selecting a transmit site on the first die that reduces a distance between the first driver and a load of the plurality of loads on the second die; and modifying the circuit design including moving the first driver to the selected transmit site on the first die. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. In particular, one embodiment includes all the following features in combination. Modifying the circuit design comprises creating a replica of the driver and moving the replica of the driver to the selected transmit site. The transmit site is one of a plurality of transmit sites of inter-die channels within an interposer connecting the first die and the second die. The actions include selecting a receive site on the second die that reduces a second distance between the first driver and one of the plurality of loads on the second die, wherein modifying the circuit design comprises moving the load to the receive site on the second die. Selecting the transmit site comprises: generating, in a two-dimensional representation of the initial component placement of the circuit design, a bounding box that covers respective locations of the first driver and the plurality of loads on the second die; and computing a location within the two-dimensional representation that reduces respective distances between the first driver and one or more loads on the second die; and selecting a transmit site based on the computed location. Selecting a transmit site based on the computed location comprises selecting a transmit site that is closest to the computed location. Selecting the transmit site based on the computed location comprises: identifying a plurality of candidate transmit sites that are closest in the two-dimensional representation to the computed location; and iteratively evaluating each candidate transmit site using one or more placement legality criteria until identifying a candidate transmit site that is a legal placement site according to the one or more placement legality criteria. Computing the location within the two-dimensional representation comprises: computing a weighted average location using weights that represent respective timing properties of inter-die channels for each of a plurality of candidate transmit sites. Modifying the circuit design comprises: generating a driver replica at the selected transmit site; and modifying a netlist of the circuit design to reassign an input of the first driver to be an input to the driver replica at the selected transmit site. Modifying the circuit design is performed before a routing process selects one or more inter-die channels between the first driver and plurality of loads on the second die. Moving the first driver to the selected transmit site causes the routing process to select an inter-die channel of the selected transmit site when routing between the selected transmit site and the plurality of loads on the second die.

In general, another innovative aspect of the subject matter described in this specification can be embodied in methods that include the actions of receiving a circuit design of a multi-die integrated circuit (IC) device having a first die connected with a second die, wherein the circuit design specifies a respective initial component placement of each of a plurality of components on the first die and the second die and an initial routing assignment between the components on the first die and the second die; generating a tree representation of connections for a first driver on the first die having one or more loads on the second die, wherein the first driver is represented as a root node of the tree, each of a plurality of loads of the first driver are represented as leaf nodes in the tree, and one or more inter-die channels in the initial routing assignment between the first driver on first die and respective loads on the second die are represented as interior nodes of the tree; generating one or more inter-die clusters of loads for each interior node in the tree representing an inter-die channel in the initial routing assignment, each cluster having one or more loads represented by respective leaf nodes that are descendent from a same respective interior node in the tree respecting a respective interposed channel; selecting a first inter-die cluster of loads for a first inter-die channel; modifying the circuit design to move the first driver to a first transmit site of the first inter-die channel or to replicate the first driver at the first transmit site of the first inter-die channel. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. In particular, one embodiment includes all the following features in combination. Moving or replicating the driver comprises: determining that one of the clusters of loads includes loads on the first die; and in response, replicating the driver at the first transmit site. Moving or replicating the driver comprises: determining that none of the clusters of loads include loads on the first die; and in response, moving the driver to the first transmit site. The tree representation further comprises interior nodes that represent other routing resources between the first driver and one or more loads on the first die. The actions include determining that a second cluster of loads has a single flop on the second die; and in response, modifying the circuit design to move the single flop on the second die to a receive site of the first inter-die channel. The actions include modifying the circuit design to replicate the driver at a second transmit site of a second inter-die channel represented by an interior node of the tree. Modifying the circuit design comprises: identifying an available flop of the first transmit site of the first inter-die channel; and modifying a netlist of the circuit design to assign an input of the first driver to be an input to the available flop of the first transmit site. Modifying the circuit design comprises modifying the initial routing assignment to select a different set of routing resources for one or more components affected by moving or replicating the first driver. The actions include performing incremental routing changes after the driver modifications have been completed.

Particular embodiments of the subject matter described in this specification can be implemented so as to realize one or more of the following advantages. Performing physical synthesis in the post-placement stage improves the timing on inter-die communications channels. This in turn leads to faster timing convergence. Performing physical synthesis in the post-routing stage improves the timing on inter-die communications channels. This technique also leads to faster timing convergences. This approach efficiently handles designs with many clock-groups, as modern designs commonly have up to 30-40 clock-groups in a design. Therefore, it is important to develop techniques that can efficiently handle timing-closure in such complex designs. The techniques described below can be applied to all timing-critical designs, independent of the content of the design, e.g., independent of what types of components or logic blocks are included in the design. This approach is not dependent on any specific algorithm for physical optimization. Instead, the techniques described below can also be used with any newly developed optimization techniques. The process is fully automated and integrated and can be integrated into a single command in a circuit design application. As a result, the user does not need to perform any manual modifications of the design.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes techniques for performing post-placement physical synthesis operations in a multi-die IC, in other words, after components of a netlist have been assigned a location. This specification also describes techniques for performing post-routing physical synthesis operations for a multi-die IC, in other words, after routing resources have been assigned to make connections specified by the netlist.

In this specification, physical synthesis means modifying a netlist of physical IC components. A netlist of physical IC components can be modified by: replicating components, replacing components, adding components, and deleting components, as well as adding, modifying, or removing connections between components, to name just a few examples.

Figure 1:
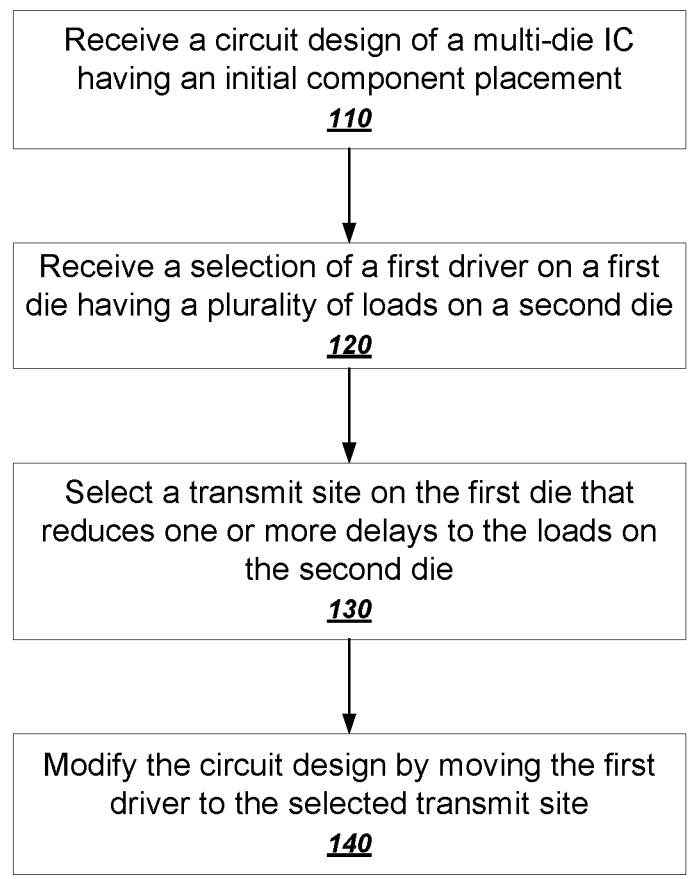
FIG. 1 is a flowchart of an example process for performing a post-placement physical synthesis process.

FIG. 1 is a flowchart of an example process for performing a post-placement physical synthesis process. As described above, IC design flows generally perform placement after synthesis and before routing. Thus, the example post-placement physical synthesis can be performed after the placement stage and before the routing stage. For convenience, the process will be described as being performed by a system of one or more computers, located in one or more locations, and programmed appropriately in accordance with this specification. For example, an electronic design automation application, e.g., the application 755 of computer system 700 of FIG. 7, appropriately programmed, can perform the example process.

The system receives a circuit design of a multi-die IC having an initial component placement (110). The initial component placement is data that assigns each component to a particular location on a first die or a second die of the multi-die IC.

The system receives a selection of a first driver on the first die having a plurality of loads on the second die (120). The system can perform the selection automatically, e.g., by selecting and ranking drivers that do not meet one or more post-placement timing criteria with their respective loads. Alternatively or in addition, a user can provide a selection of a driver to optimize. For example, the system can automatically identify drivers that do not meet the one or more post-placement timing criteria, and then a user can select a driver from the identified drivers.

The system selects a transmit site on the first die that reduces one or more delays to the loads on the second die (130). Often, when a driver-to-load timing path fails a timing requirement, it is because the load is physically further away than the other loads.

Therefore, the system can select a transmit site on the first die that reduces the distance between the driver and a load that failed a timing requirement. balances the distance between the driver and the loads. To do so, the system can either move the driver to the transmit site or replicate the driver at the transmit site. By placing the driver or a replicated version thereof to be at a transmit site, the distance between the driver and the load on the other die is automatically reduced.

Each transmit site is a component that is configured to select between multiple inputs in order to control which data is sent over an inter-die communication channel. Each transmit site has one or more dedicated flip-flop sites. The placement process generally does not make heavy use of flip-flop transmit sites because selecting a transmit site as a location for a driver flip-flop can constrain the location of the loads for this driver. In particular, a dedicated flip-flop located in a transmit site can only drive loads across the channel on a different die. Therefore, after the placement stage, most if not all dedicated flip-flops of transmit sites are typically unused.

To select a transmit site that reduces the distance to a load, the system can use a variety of approaches. For example, the system can select a next-closest transmit site to the load that failed a timing requirement. Alternatively or in addition, the system can iterate over transmit sites in order of decreasing distance to the loads that failed the timing requirement and stop when the timing requirement is satisfied.

Alternatively or in addition, the system can select a transmit site that further balances the distances between the loads. In this context, balancing the distances means reducing the distance between the driver and one or more loads so that the difference between the maximum and minimum distances from the driver to each of its loads is reduced. The system can perform any appropriate technique for selecting a transmit site that balances the respective distances to the loads.

In some implementations, the system selects a transmit site using a two-dimensional representation of the component locations to select the transmit site. For example, the system can generate within the two-dimensional representation a bounding box that covers the initial driver location and all respective locations of the loads. For example, the system can compute a bounding box that defines the substantially smallest rectangle that covers the initial driver location and the locations of all the loads. Because the driver is on a different die than the loads, the bounding box will generally span the gap between the multiple dies in the two-dimensional representation.

The system can then compute a location within the bounding box that reduces distances to one or more loads. For example, the system can compute an average location within the bounding box according to the locations of the loads. In some implementations, the system takes into further consideration the individual properties of the inter-die communications channels that are likely to be used for routing. Some channels may be physically longer than others, and thus may have different timing characteristics than shorter channels. To take the individual properties of the inter-die communications channels into consideration, the system can compute a weighted average location within the bounding box, with each individual load distance being weighted by a value that represents the timing characteristics or latency of a corresponding inter-die communications channel Because routing has not yet occurred during this stage, the system can approximate the location by assuming that each load will be served by a receive site that the load is closest to. The system can then use the individual properties of an inter-die communications channel that connects to the closest receive site.

After computing a location that reduces the distances to one or more of the loads, the system can selects a transmit site based on the computed location. In some instances, this involves merely choosing a transmit site that is closest to the computed location. However, in practice, the closest transmit site is not always available. The closest transmit site may already be occupied or the site might not be a legal location to place the driver. For example, in some designs, if another flip-flop at a transmit site is occupied, other flip-flops at the same transmit site must be occupied by drivers that share signals with flip-flop that is already at the transmit site. Another a constraint may be that all flip-flop flops at a transmit site must share the same clock.

Thus, the system can iterate over the transmit sites in order according to distance to the computed location. The system can then determine whether the selected transmit site is a legal location for the driver. If not, the system can iterate to the next transmit site.

If transmit sites have dedicated multiple flip-flops, the system can iterate over all candidate flip-flops at a transmit site before iterating to another transmit site.

In some implementations, if the system experiences greater than N failed candidate transmit sites, the process ends without changing the netlist.

The system modifies the circuit design including moving the first driver to the selected transmit site on the first die (140). For example, if the driver is replicated at the transmit site, the system can modify the netlist so that any inputs to the driver become inputs of the dedicated flip-flop of the transmit site. If the driver is moved to the transmit site, the system can simply change the assignment of the driver to be the flip-flop at the transmit site.

Moving the driver to the transmit site may have downstream affects in the design flow. For example, typically moving the driver to a transmit site of an inter-die communications channel means that the channel will be used during the routing stage to connect the driver to the loads.

Figure 2B:
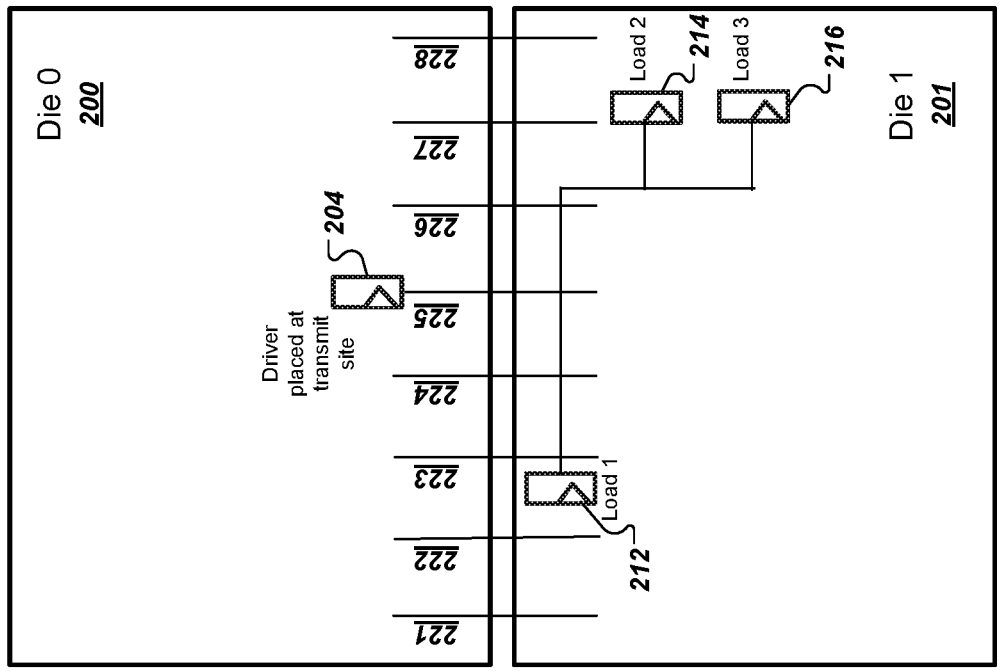
FIGS. 2A-2B illustrate an example of moving a driver to a transmit site.
Figure 2A:
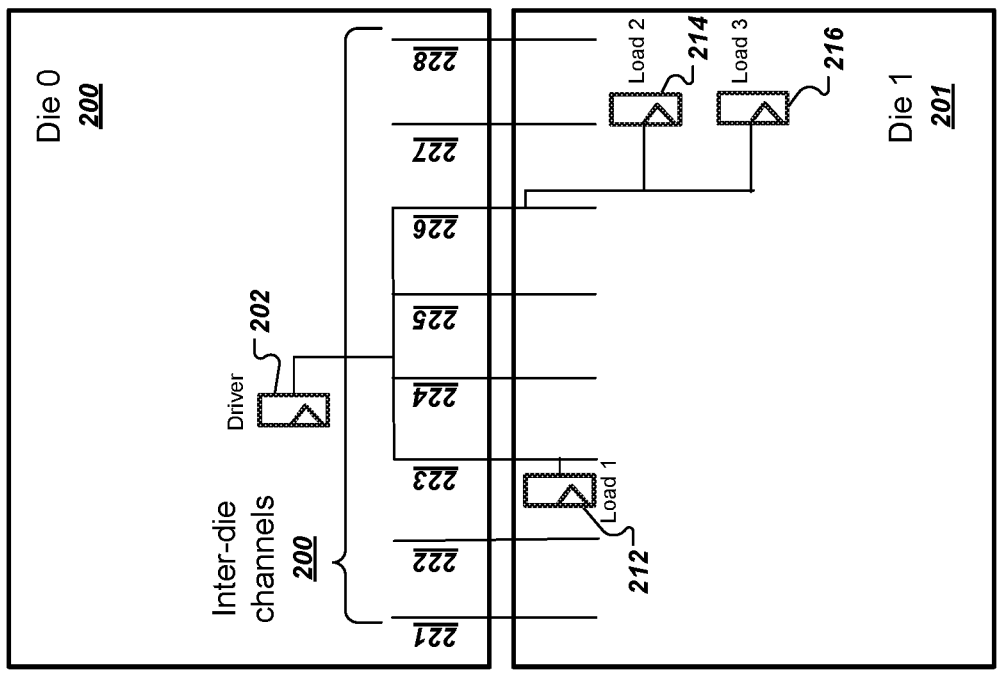

FIGS. 2A-2B illustrate an example of moving a driver to a transmit site.

In FIG. 2A, a driver 202 on a first die 200 drives three loads 212, 214, and 216 on a second die 201. The first die 200 and the second die 201 are communicatively coupled by communications channels 221-228. The vertical lines of the communications channels are a simplified representation of the actual wiring between the dies as well as the dedicated flip-flops at both the transmit site and receive site of each inter-die communications channel.

As can be seen from FIG. 2A, the driver 202 is furthest away from the load 216. This longest path can cause the design to violate timing constraints.

Therefore, the system can improve the timing properties of this part of the system by performing a post-placement physical synthesis optimization process. To do so, the system can perform the example process described above with reference to FIG. 1. The process computes a location that reduces the distances to the loads and selects a legal transmit site that is closest to the computed location.

As shown in FIG. 2B, the driver 202 has been moved to the transmit site 204 for the inter-die communications channel 225. This move reduces the longest path between the driver and the load 216. This modification also balances the distances between the driver and each of the loads.

Figure 3:
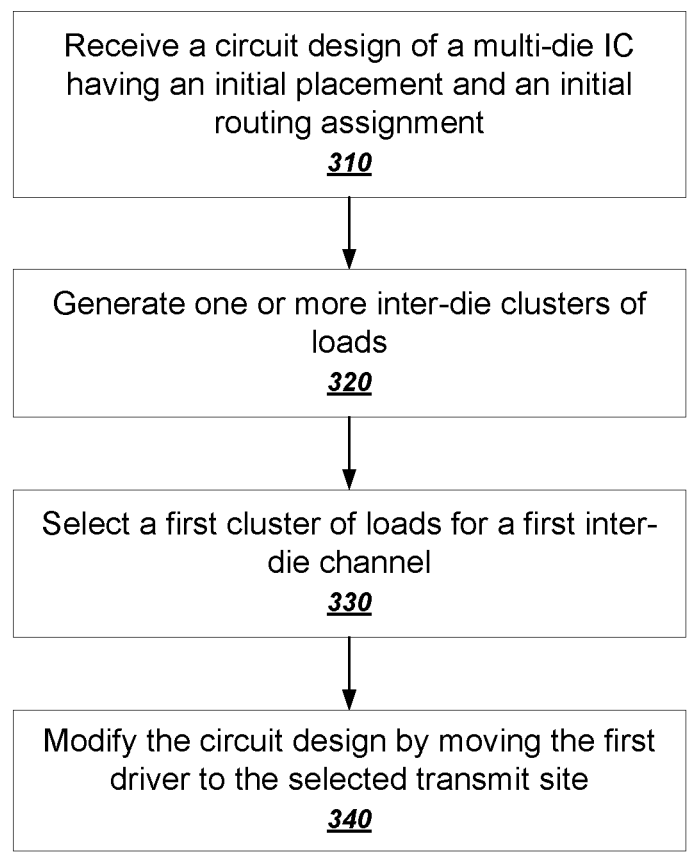
FIG. 3 is a flowchart of an example process for performing a post-routing physical synthesis process.

FIG. 3 is a flowchart of an example process for performing a post-routing physical synthesis process. The example process can be performed after the synthesis, placement, and routing stages of a design flow, which may or may not include the post-placement optimization described above with reference to FIG. 2. For convenience, the process will be described as being performed by a system of one or more computers, located in one or more locations, and programmed appropriately in accordance with this specification. For example, an electronic design automation application, e.g., the application 755 of computer system 700 of FIG. 7, appropriately programmed, can perform the example process.

The system receives a circuit design of a multi-die IC having an initial routing assignment (310). For example, the system can receive a circuit design that has had an initial placement that assigns a respective location in the IC to each component and which has an assignment of routing resources. The assignment of routing resources specifies how to implement the connections specified by a netlist of the design. Some of the routing resources will be inter-die communications channels that connect components on different respective dies of the multi-die IC.

The system generates one or more inter-die clusters of loads for a first driver on a first die having loads on a second die (320). Each inter-die cluster can include loads on the second die that are each connected to the first driver by a same respective inter-die channel according to the initial routing assignment.

The system can use any appropriate technique for generating the inter-die clusters. In some implementations, the system generates inter-die clusters by grouping nodes according to their relationship in a tree representation of connections for the first driver on the first die and its loads on the second die. The tree representation can have nodes that each represent cell components of the design as well as routing resources. For example, the root node of the tree can represent the first driver, and leaf nodes of the tree can represent loads of the driver. Interior nodes between the root node and the leaf nodes can each represent one or more routing resources that connect the driver to the loads in the circuit design.

Similarly to the process described above, the system can select the first driver automatically, e.g., from a group of drivers that do not meet one or more post-routing timing criteria with their respective loads. Alternatively or in addition, a user can provide a selection of the first driver to optimize.

Figure 4A:
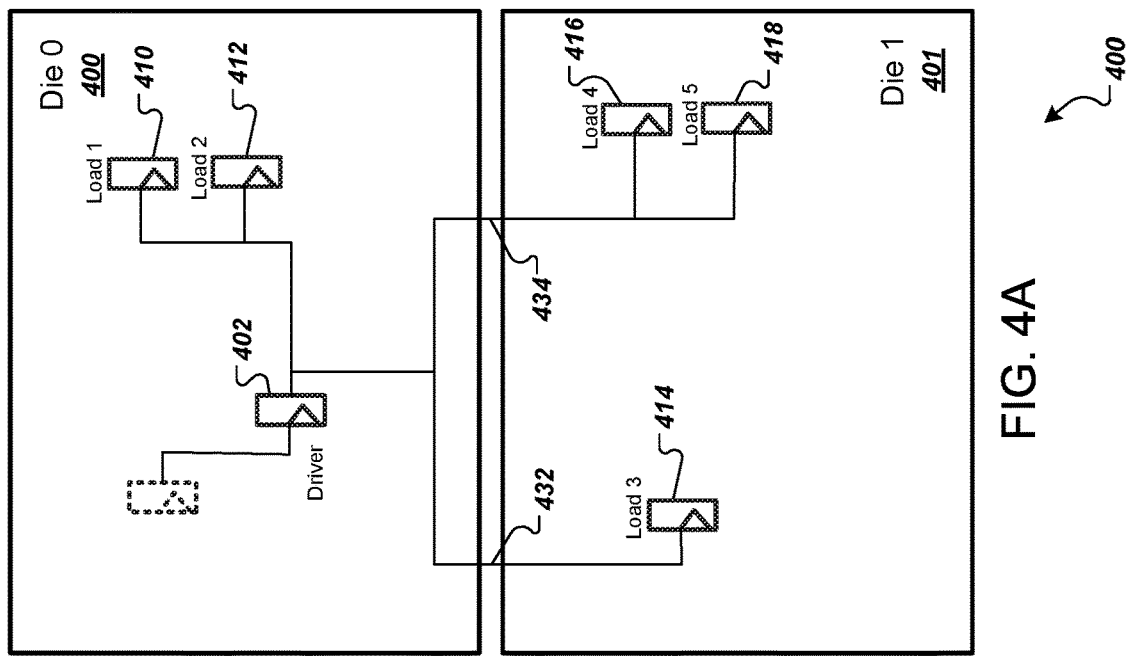
FIG. 4A illustrates the design of an example multi-die IC having a driver that drives loads on multiple dies.

FIG. 4A illustrates the design of an example multi-die IC having a driver that drives loads on multiple dies. The multi-die IC includes a first die 400 and a second die 401 connected with two inter-die communications channels 432 and 434.

The driver 402 drives two loads on the first die 400, e.g., the loads 410 and 412. The driver 402 also drives three loads on the second die 401, e.g., the loads 414, 416, and 418. The load 414 is driven by a first inter-die communications channel 432, while the loads 416 and 418 are driven by a second inter-die communications channel 434.

Figure 5:
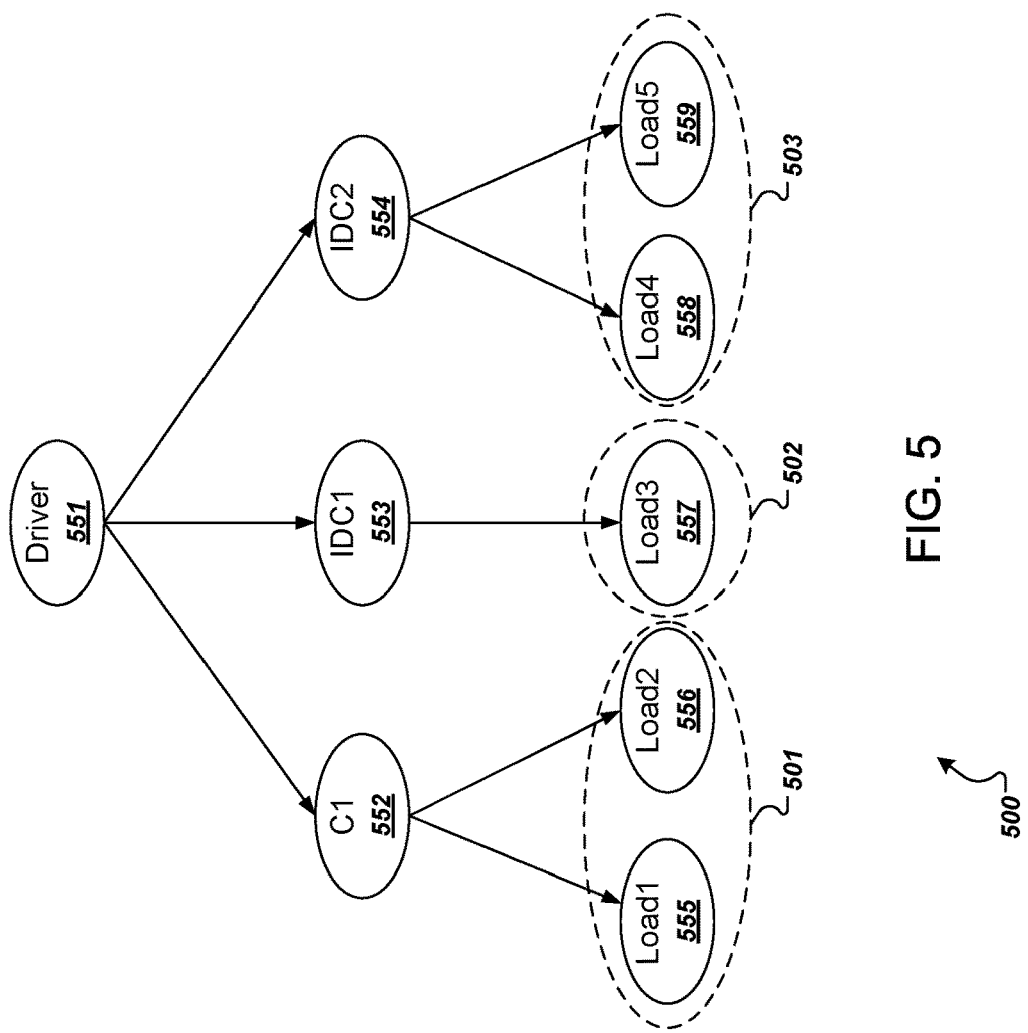
FIG. 5 illustrates an example tree representation.

FIG. 5 illustrates an example tree representation 500 of the design shown in FIG. 4A. The tree representation 500 includes a root node 551 representing the driver 402, and leaf nodes 555-559 representing the loads 410, 412, 414, 416, and 418 respectively.

The tree representation 500 also includes interior nodes 552, 553, and 554 that represent routing resources between the driver 402 and the loads. A first interior node 552 represents intra-die routing resources between the driver 402 and the loads 410 and 412 on the same first die 400. A second interior node 553 represents the inter-die communications channel 432 that connects the driver 402 to the load 414. A third interior node 554 represents the inter-die communications channel 434 that connects the driver 402 to each of the loads 416 and 418. Although this example illustrates a tree representation having only three levels, in practice the tree can have an arbitrary number of levels between a driver at the top and loads in the leaves. In some implementations, the interior nodes can represent routing resources or netlist components.

To generate inter-die clusters from a tree representation, the system can generate one or more clusters of loads represented by leaf nodes in the tree representation. In other words, the system can group together loads that are represented by leaf nodes that descend from a same parent node in the tree representation. Each cluster that represents leaves descendent from an interior node representing an inter-die communications channel will be referred to in this specification as an inter-die cluster. In other words, inter-die clusters have loads that must be driven using inter-die communications channels.

As shown in FIG. 5, the system can generate a cluster of loads 501 for loads 410 and 412, a cluster of loads 502 for the load 414, and a cluster of loads 503 for the loads 416 and 418.

As shown in FIG. 3, the system selects a first inter-die cluster of loads for a first inter-die communications channel (330). The system can select the first inter-die cluster of loads in a variety of ways. In some implementations, the system automatically selects the first inter-die cluster by identifying a cluster having loads that do not satisfy one or more post-routing timing requirements. In some other implementations, the system can receive a user selection of one of the clusters of loads.

The system modifies the circuit design by moving or replicating the first driver at a first transmit site of the first inter-die communications channel (340). An example process for determining how to modify the netlist is described in more detail below with reference to FIG. 6.

Figure 4C:
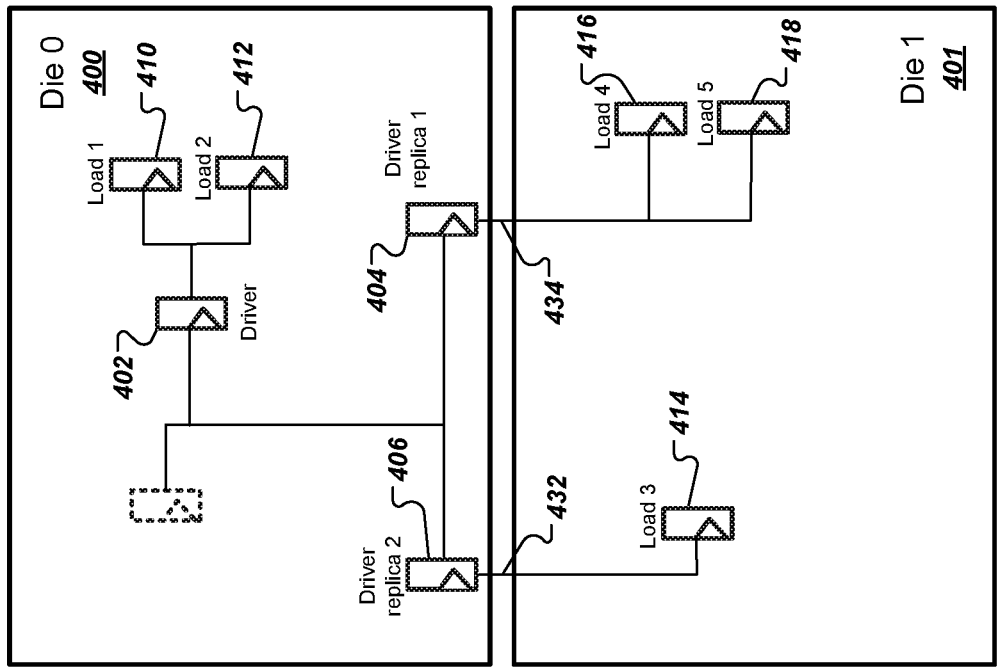
FIG. 4C illustrates a design after replicating a driver for two inter-die clusters.
Figure 4B:
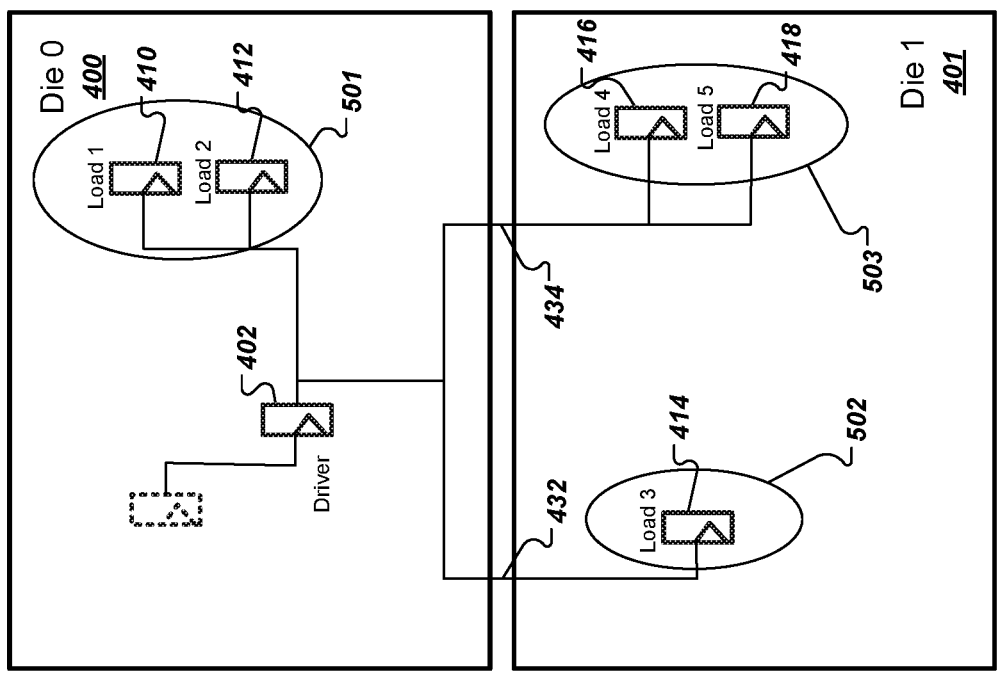
FIG. 4B illustrates clusters of loads.

FIG. 4B illustrates the clusters of loads 501, 502, and 503 in the original circuit design.

FIG. 4C illustrates the design after replicating the driver for both inter-die clusters of loads 502 and 503. In this example, the system has replicated the driver for both inter-die communications channels 432 and 434. This results in netlist changes including adding driver replicas 404 and 406, as well as generating connections from the source of driver 402 to each of the driver replicas 404 and 406. In addition, the system also modifies the netlist by placing the driver replicas 404 and 406 at respective transmit sites for the respective inter-die communications channels.

Because the example process is being performed post-routing, the inter-die communications channel that is used for any particular load or cluster of loads will be known. Therefore, the system can select any appropriate flip-flop at a transmit site for the corresponding inter-die communications channel.

After modifying the netlist, the system can perform incremental routing processes to refine or assign the routing resources that are required to effectuate the connections specified by the modified netlist.

This modification to the design of the IC reduced the maximum distance between the driver and its corresponding loads, which thereby results in better timing performance of the IC.

Figure 6:
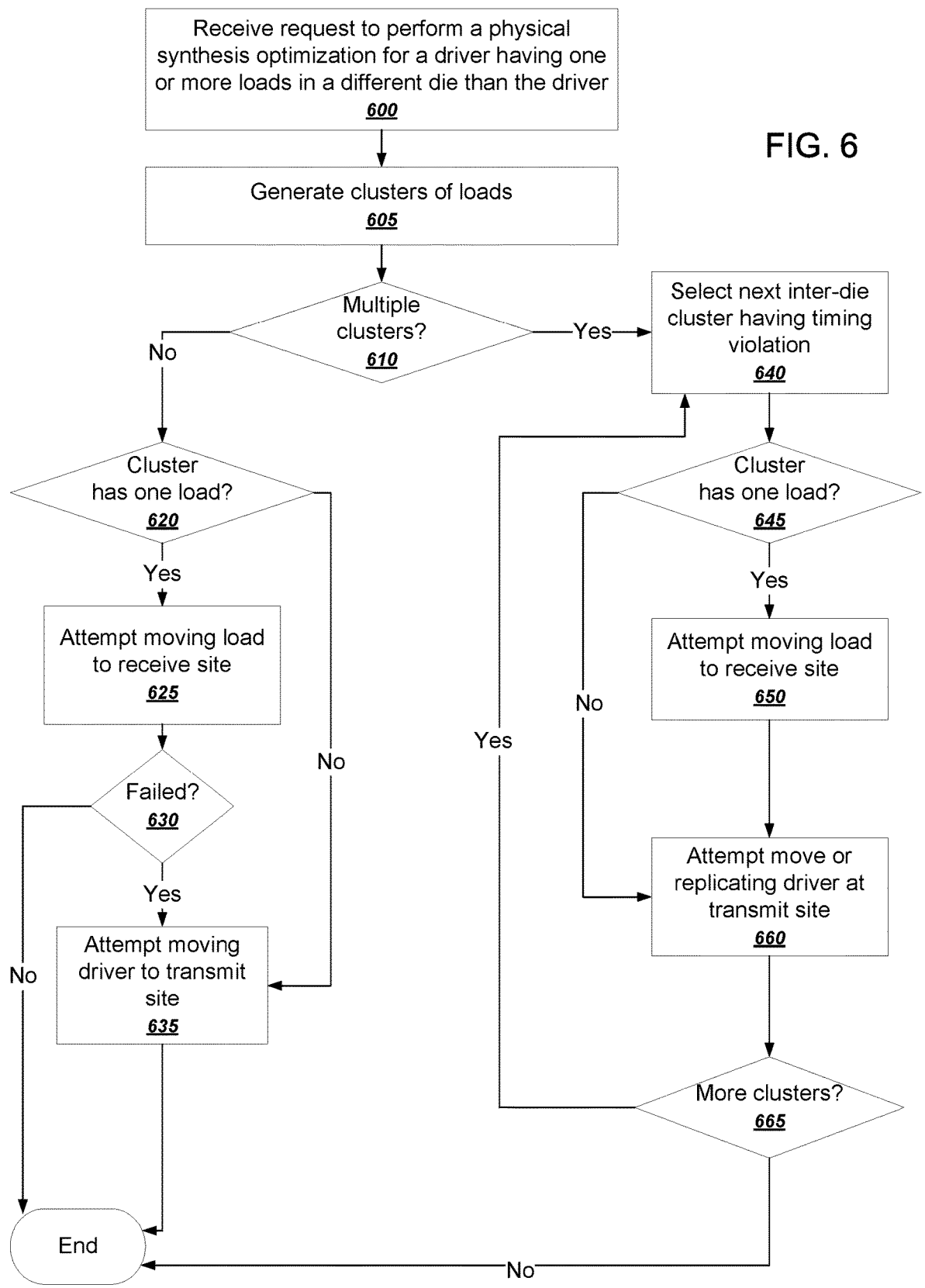
FIG. 6 is a flowchart of an example process for determining how to modify a driver after generating clusters of loads.

FIG. 6 is a flowchart of an example process for determining how to modify a driver after generating clusters of loads. The goal of the example process is to minimize the number of drivers added while maximizing the chances that the post-routing optimization will improve the design.

The example process can be performed as part of a post-placement or post-routing synthesis process, e.g., the processes described above with reference to FIGS. 1 and 3. For convenience, the process will be described as being performed by a system of one or more computers, located in one or more locations, and programmed appropriately in accordance with this specification. For example, an electronic design automation application, e.g., the application 755 of computer system 700 of FIG. 7, appropriately programmed, can perform the example process.

The system receives a request to perform a physical synthesis optimization for a driver having one or more loads in a different die than the driver (600). In some implementations, the system automatically performs the example process only for drivers having inter-die connections do not satisfy one or more timing requirements.

The system generates one or more clusters of loads (605). Generally, each cluster includes one or more loads that are on a different die than the driver. The clusters of loads will each be associated with one or more inter-die communications channels. As described above, each channel can have a transmit site on the driver's die and a receive site on the loads' die. Each of the transmit site and the receive site can have one or more dedicated flip flops that are candidate components for moving the driver or the loads or replicating the driver.

For example, the clusters can be generated as loads on a different die as described above with reference to FIG. 1 or from a tree representation as described above with reference to FIG. 3.

The system determines whether there are multiple clusters of loads (610).

If there is only one cluster, the system determines whether the cluster has only one load (620).

If so, the system attempts to move the load to a receive site of the inter-die communications channel (625). In other words, the system attempts to modify the netlist by replacing the original load with a flip-flop at the receive site of the inter-die communications channel. In this context of post-routing synthesis, attempting to move a load to a receive site or attempting to move a driver to a transmit site can involve performing a timing test to determine whether or not the timing performance of the design has been improved. If not, the system can designate the attempt as having failed, and the system can discard or revert the proposed change to leave the design as it was. The attempt can also include searching the available flip-flops at the receive site or the transmit site to determining whether any of the flip-flops are available and legal locations for the load. But in some implementations, when the design is after the routing stage, the netlist already connects the load to a particular receive site, or equivalently, connects the driver to a particular transmit site, that has an available flip-flop, and therefore, searching is not required.

The system determines whether or not the move failed (630). As described above, the move failing can mean that a timing test failed or that no available and legal flip-flop at the receive site of the inter-die communications channel could be found. If the move was successful, the process ends (branch to end).

If the move failed (630), or if the cluster had multiple loads (620), the system attempts to move the driver to a transmit site of the inter-die communications channel (branch to 635). As described above, an attempt to move a driver to a transmit site can include performing a timing test, searching for a legal and available flip-flop at the transmit site, or both. The process then ends, regardless of whether or not the drive move was successful.

If there were multiple clusters (610), the system iterates over the inter-die clusters by selecting a next inter-die cluster having a timing violation (640). The system can perform the check for a timing violation to make sure that the synthesis optimization is actually improving the design flow by leading to a faster converge. In other words, the system can have a built in preference for tackling timing issues rather than trying to optimize every inter-die cluster in the design. The latter approach may actually introduce more problems than it solves, and thus the system can process only clusters that have timing violations.

As described above, an inter-die cluster is a cluster of loads that are on a different die than the driver. Each inter-die cluster will also be associated with a respective inter-die communications channel that has been assigned or predicted to be assigned to connect driver to the loads in the cluster.

The system determines whether the selected cluster has one load (645). If so, the system attempts to move the load to a receive site of the associated inter-die communications channel (branch to 650). If the cluster had multiple loads, the system bypasses this step (branch to 660).

The system attempts to move or replicate the driver at a transmit site of the associated inter-die communications channel (branch to 660).

If more clusters remain (665), the system selects a next inter-die cluster for processing (branch to 640). If not, the process ends (branch to end).

Figure 7:
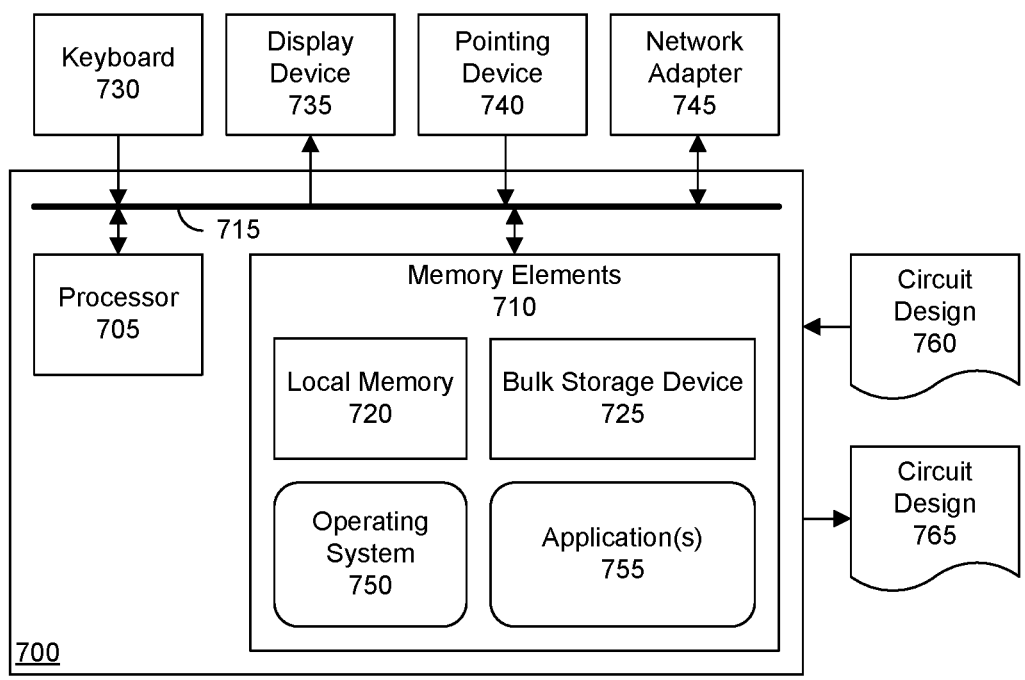
FIG. 7 is a block diagram illustrating an example data processing system.

After performing any post-routing synthesis, the system can then perform incremental routing changes in order to allocate routing resources for the changes to the netlist. For example, FIG. 7 is a block diagram illustrating an example data processing system 700. As pictured, system 700 includes at least one processor, e.g., a central processing unit (CPU), 705 coupled to memory elements 710 through a system bus 715 or other suitable circuitry. System 700 stores program code (e.g., computer readable program instructions) within memory elements 710. Processor 705 executes the program code accessed from memory elements 710 via system bus 715. Memory elements 710 include one or more physical memory devices such as, for example, a local memory 720 and one or more bulk storage devices 725. Local memory 720 refers to random access memory (RAM) or other non-persistent memory device(s) generally used during actual execution of the program code. Bulk storage device 725 may be implemented as a hard disk drive (HDD), solid state drive (SSD), or other persistent data storage device. System 700 may also include one or more cache memories (not shown) that provide temporary storage of at least some program code in order to reduce the number of times program code must be retrieved from bulk storage device 725 during execution.

Input/output (I/O) devices such as a keyboard 730, a display device 735, and a pointing device 740 may optionally be coupled to system 700. In some cases, one or more of the I/O devices may be combined as in the case where a touchscreen is used as display device 735. In that case, display device 735 may also implement keyboard 730 and pointing device 740.

The I/O devices may be coupled to system 700 either directly or through intervening I/O controllers. One or more network adapters 745 may also be coupled to system 700 to enable system 700 to become coupled to other systems, computer systems, remote printers, and/or remote storage devices through intervening private or public networks. Modems, cable modems, Ethernet cards, and wireless transceivers and/or radios are examples of different types of network adapter 745 that may be used with system 700. Depending upon the particular implementation of system 700, the specific type of network adapter, or network adapters as the case may be, will vary.

As pictured in FIG. 7, memory elements 710 may store an operating system 750 and one or more applications 755. Application 755, for example, may be an EDA application. In one aspect, operating system 750 and application 755, being implemented in the form of executable program code, are executed by system 700 and, in particular, by processor 705. As such, operating system 750 and application 755 may be considered an integrated part of system 700. Operating system 750, application 755, and any data items used, generated, and/or operated upon by system 700 are functional data structures that impart functionality when utilized by system 700.

In one aspect, system 700 may be a computer or other device that is suitable for storing and/or executing program code. System 700 may represent any of a variety of computer systems and/or devices that include a processor and memory and that are capable of performing the operations described within this disclosure. In some cases, the particular computer system and/or device may include fewer components or more components than described. System 700 may be implemented as a single system as shown or as a plurality of networked or interconnected systems each having an architecture the same as, or similar to, that of system 700.

In operation, system 700 may receive an input circuit design 760. Circuit design 760 is a programmatic description of an electronic system. For example, input circuit design 760 may be specified as one or more hardware description language (HDL) files, one or more netlist(s), a register transfer level description, or the like. System 700 may perform a design flow on circuit design 760 resulting in output circuit design 765. In one aspect, output circuit design 765 may be synthesized, placed, and routed by system 700. Further, system 700 may perform physical synthesis within an overall placement process of input circuit design 760 as part of the design flow.

Figure 8:
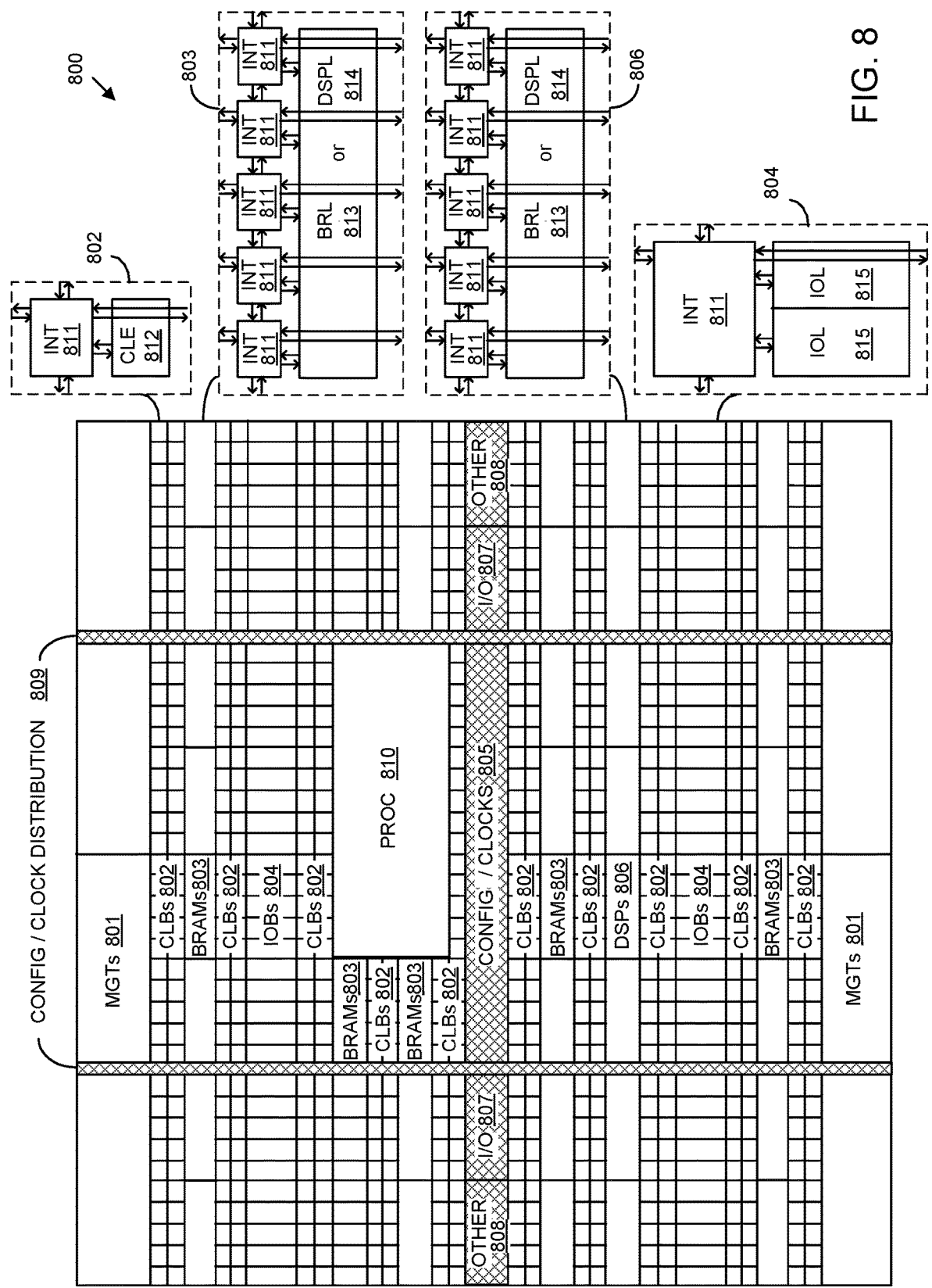
FIG. 8 is a block diagram illustrating an example architecture for an IC.

FIG. 8 is a block diagram illustrating an example architecture 800 for an IC. In one aspect, architecture 800 may be implemented within a programmable IC. For example, architecture 800 may be used to implement a field programmable gate array (FPGA). Architecture 800 may also be representative of a system-on-chip (SOC) type of IC. An SOC is an IC that includes a processor that executes program code and one or more other circuits. The other circuits may be implemented as hardwired circuitry, programmable circuitry, and/or a combination thereof. The circuits may operate cooperatively with one another and/or with the processor.

As shown, architecture 800 includes several different types of programmable circuit, e.g., logic, blocks. For example, architecture 800 may include a large number of different programmable tiles including multi-gigabit transceivers (MGTs) 801, configurable logic blocks (CLBs) 802, random access memory blocks (BRAMs) 803, input/output blocks (IOBs) 804, configuration and clocking logic (CONFIG/CLOCKS) 805, digital signal processing blocks (DSPs) 806, specialized I/O blocks 807 (e.g., configuration ports and clock ports), and other programmable logic 808 such as digital clock managers, analog-to-digital converters, system monitoring logic, and so forth.

In some ICs, each programmable tile includes a programmable interconnect element (INT) 811 having standardized connections to and from a corresponding INT 811 in each adjacent tile. Therefore, INTs 811, taken together, implement the programmable interconnect structure for the illustrated IC. Each INT 811 also includes the connections to and from the programmable logic element within the same tile, as shown by the examples included at the top of FIG. 8.

For example, a CLB 802 may include a configurable logic element (CLE) 812 that may be programmed to implement user logic plus a single INT 811. A BRAM 803 may include a BRAM logic element (BRL) 813 in addition to one or more INTs 811. Typically, the number of INTs 811 included in a tile depends on the height of the tile. As pictured, a BRAM tile has the same height as five CLBs, but other numbers (e.g., four) also may be used. A DSP tile 806 may include a DSP logic element (DSPL) 814 in addition to an appropriate number of INTs 811. An 10B 804 may include, for example, two instances of an I/O logic element (IOL) 815 in addition to one instance of an INT 811. The actual I/O pads connected to IOL 815 may not be confined to the area of IOL 815.

In the example pictured in FIG. 8, a columnar area near the center of the die, e.g., formed of regions 805, 807, and 808, may be used for configuration, clock, and other control logic. Horizontal areas 809 extending from this column may be used to distribute the clocks and configuration signals across the breadth of the programmable IC.

Some ICs utilizing the architecture illustrated in FIG. 8 include additional logic blocks that disrupt the regular columnar structure making up a large part of the IC. The additional logic blocks may be programmable blocks and/or dedicated circuitry. For example, a processor block depicted as PROC 810 spans several columns of CLBs and BRAMs.

In one aspect, PROC 810 may be implemented as dedicated circuitry, e.g., as a hardwired processor, that is fabricated as part of the die that implements the programmable circuitry of the IC. PROC 810 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 810 may be omitted from architecture 800 and replaced with one or more of the other varieties of the programmable blocks described. Further, such blocks may be utilized to form a "soft processor" in that the various blocks of programmable circuitry may be used to form a processor that can execute program code as is the case with PROC 810.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 8 that are external to PROC 810 such as CLBs 802 and BRAMs 803 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 810.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

In the case of an SOC, the configuration bitstream may specify the circuitry that is to be implemented within the programmable circuitry and the program code that is to be executed by PROC 810 or a soft processor. In some cases, architecture 800 includes a dedicated configuration processor that loads the configuration bitstream to the appropriate configuration memory and/or processor memory. The dedicated configuration processor does not execute user-specified program code. In other cases, architecture 800 may utilize PROC 810 to receive the configuration bitstream, load the configuration bitstream into appropriate configuration memory, and/or extract program code for execution.

FIG. 8 is intended to illustrate an example architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 8 are purely exemplary. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 810 within the IC are for purposes of illustration only and are not intended as limitations.

In one aspect, a circuit design may be processed as described herein for implementation within a target IC that uses architecture 800 or an architecture similar to architecture 800. It should be appreciated that the inventive arrangements described within this disclosure may also be used for circuit designs that may be implemented as ASICs.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g, a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A computer-implemented method comprising:
receiving, using computer hardware, a circuit design of a multi-die integrated circuit (IC) device having a first die connected with a second die, wherein the circuit design specifies a respective initial component placement of each of a plurality of components on the first die and the second die;
receiving, using the computer hardware, a selection of a first driver on the first die having a plurality of loads on the second die;
selecting, using the computer hardware, a transmit site on the first die that reduces a distance between the first driver and a load of the plurality of loads on the second die; and
modifying, using the computer hardware, the circuit design including moving the first driver to the selected transmit site on the first die.

2. The method of claim 1, wherein the modifying the circuit design comprises creating a replica of the driver and moving the replica of the driver to the selected transmit site.

3. The method of claim 1, wherein the transmit site is one of a plurality of transmit sites of inter-die channels within an interposer connecting the first die and the second die.

4. The method of claim 1, further comprising:
selecting a receive site on the second die that reduces a second distance between the first driver and one of the plurality of loads on the second die,
wherein modifying the circuit design comprises moving the load to the receive site on the second die.

5. The method of claim 4, wherein the selecting the transmit site comprises:
generating, in a two-dimensional representation of the initial component placement of the circuit design, a bounding box that covers respective locations of the first driver and the plurality of loads on the second die; and
computing a location within the two-dimensional representation that reduces respective distances between the first driver and one or more loads on the second die; and
selecting a transmit site based on the computed location.

6. The method of claim 5, wherein the selecting a transmit site based on the computed location comprises selecting a transmit site that is closest to the computed location.

7. The method of claim 5, wherein the selecting the transmit site based on the computed location comprises:
identifying a plurality of candidate transmit sites that are closest in the two-dimensional representation to the computed location; and
iteratively evaluating each candidate transmit site using one or more placement legality criteria until identifying a candidate transmit site that is a legal placement site according to the one or more placement legality criteria.

8. The method of claim 5, wherein the computing the location within the two-dimensional representation comprises:
computing a weighted average location using weights that represent respective timing properties of inter-die channels for each of a plurality of candidate transmit sites.

9. The method of claim 1, wherein the modifying the circuit design comprises:
generating a driver replica at the selected transmit site; and
modifying a netlist of the circuit design to reassign an input of the first driver to be an input to the driver replica at the selected transmit site.

10. The method of claim 1, wherein the modifying the circuit design is performed before a routing process selects one or more inter-die channels between the first driver and plurality of loads on the second die.

11. The method of claim 10, wherein the moving the first driver to the selected transmit site causes the routing process to select an inter-die channel of the selected transmit site when routing between the selected transmit site and the plurality of loads on the second die.

12. A system, comprising:
a processor configured to initiate operations including:
receiving a circuit design of a multi-die integrated circuit (IC) device having a first die connected with a second die, wherein the circuit design specifies a respective initial component placement of each of a plurality of components on the first die and the second die;
receiving a selection of a first driver on the first die having a plurality of loads on the second die;
selecting a transmit site on the first die that reduces a distance between the first driver and a load of the plurality of loads on the second die; and
modifying the circuit design including moving the first driver to the selected transmit site on the first die.

13. The system of claim 12, wherein the modifying the circuit design comprises creating a replica of the driver and moving the replica of the driver to the selected transmit site.

14. The system of claim 12, wherein the transmit site is one of a plurality of transmit sites of inter-die channels within an interposer connecting the first die and the second die.

15. The system of claim 12, wherein the processor is configured to initiate operations further comprising:
selecting a receive site on the second die that reduces a second distance between the first driver and one of the plurality of loads on the second die, wherein modifying the circuit design comprises moving the load to the receive site on the second die.

16. The system of claim 12, wherein the modifying the circuit design comprises:
   generating a driver replica at the selected transmit site; and
   modifying a netlist of the circuit design to reassign an input of the first driver to be an input to the driver replica at the selected transmit site.

17. A computer program product, comprising:
   one or more computer readable storage media, and program instructions collectively stored on the one or more computer readable storage media, wherein the program instructions are executable by computer hardware to initiate operations including:
   receiving a circuit design of a multi-die integrated circuit (IC) device having a first die connected with a second die, wherein the circuit design specifies a respective initial component placement of each of a plurality of components on the first die and the second die;
   receiving a selection of a first driver on the first die having a plurality of loads on the second die;
   selecting a transmit site on the first die that reduces a distance between the first driver and a load of the plurality of loads on the second die; and
   modifying the circuit design including moving the first driver to the selected transmit site on the first die.

18. The computer program product of claim 17, wherein the modifying the circuit design comprises creating a replica of the driver and moving the replica of the driver to the selected transmit site.

19. The computer program product of claim 17, wherein the transmit site is one of a plurality of transmit sites of inter-die channels within an interposer connecting the first die and the second die.

20. The computer program product of claim 17, wherein the program code is executable by the computer hardware to initiate operations further comprising:
   selecting a receive site on the second die that reduces a second distance between the first driver and one of the plurality of loads on the second die,
   wherein modifying the circuit design comprises moving the load to the receive site on the second die.

21. The computer program product of claim 17, wherein the modifying the circuit design comprises:
   generating a driver replica at the selected transmit site; and
   modifying a netlist of the circuit design to reassign an input of the first driver to be an input to the driver replica at the selected transmit site.

\* \* \* \* \*